(12) United States Patent
Carstensen

(10) Patent No.: US 8,251,139 B2
(45) Date of Patent: Aug. 28, 2012

(54) SYSTEM AND METHOD FOR SEALING COUPLINGS IN DOWNHOLE TUBING STRINGS

(76) Inventor: Kenneth J. Carstensen, Houston, TX (US)

( * ) Notice: Subject to any disclaimer, the term of this patent is extended or adjusted under 35 U.S.C. 154(b) by 187 days.

(21) Appl. No.: 12/712,726

(22) Filed: Feb. 25, 2010

(65) Prior Publication Data

US 2011/0203790 A1    Aug. 25, 2011

(51) Int. Cl.
*F16L 25/00* (2006.01)
*E21B 17/042* (2006.01)
(52) U.S. Cl. .............. 166/242.1; 166/241.7; 277/606; 285/55; 285/383
(58) Field of Classification Search .......... 166/368, 166/242.1, 241.7, 242.6; 285/383, 355, 333, 285/55, 334.1, 13, 40, 332; 277/606, 608–609, 277/616
See application file for complete search history.

(56) References Cited

U.S. PATENT DOCUMENTS 1,938,255 A * 12/1933 Hinderliter ................ 285/106
3,472,533 A * 10/1969 Turner ........................ 285/55
* cited by examiner

*Primary Examiner* — Kenneth L Thompson
*Assistant Examiner* — Ronald Runyan
(74) *Attorney, Agent, or Firm* — Mattingly & Malur, P.C.

(57) ABSTRACT

For oil production systems, an interior two-part seal ring of resilient material is disposed within a coupling sleeve which receives threaded tubing ends in its opposite ends. The seal is asymmetric, with tapered ends of different lengths and taper angles. A length for mill end engagement is shorter than the length for field end engagement which may be made up and disconnected repeatedly. The seal configuration includes a principal body with a inwardly directed ridge between its tapered ends and a reinforcing ring of different, less permeable material, abutting the ridge and closing off one or more radial ports in the wall of the body. The central body also includes a circumferential gas groove about is periphery, which together with the radial ports, facilitates collection and release of gases permeating the seal body under high downhole pressures.

16 Claims, 2 Drawing Sheets

SYSTEM AND METHOD FOR SEALING COUPLINGS IN DOWNHOLE TUBING STRINGS

BACKGROUND OF THE INVENTION

Intercoupled lengths of tubular elements are used throughout the international oil production industry, with a high proportion of such installations being based on standards set by the American Petroleum Institute (API). For example, although there are a number of premium tubular products used for specialized or particularly difficult applications, the majority of the production tubing and casing tubular goods, including couplings, in use are made up of standardized types, such as those with API 8 round or buttress threads. Stocks of Internally Plastic Coated and Fiberglass Lined tubing and casing are now widely employed, especially where production wells are located in more environmentally demanding locations. The standard tubing sections are interconnected by internally threaded standardized cylindrical sleeves or couplers, also, if required, internally plastic coated. In the petroleum industry, product interchangeability is essential for economy where feasible because strings are made up and disassembled as many times as conditions will permit. Thus standardization, under API criteria as to sizes, materials, thread types, and tolerances, enables widespread use of tubing and casings which, can be replaced and interchanged multiple times economically during their useful lives.

Usually after manufacture, a reserve of tubing or casing is held in inventory in a pipe yard or on a drilling or production site. One end of a pipe length, called the mill end, typically is pre-attached to a coupling sleeve, for storage and shipment to at a production site when needed. At the production site, the string is assembled by stabbing the pin ("field") end of a different pipe length into the available mill end of a coupler, which is disposed vertically as the new length is engaged, rotated, and made up to proper API torque specifications. The string is built up and successively fed downhole until the production depth is reached. As production depths are historically consistently increasing, in order to gain access to new oil and natural gas sources, greater stresses and physical demands, are concomitantly being imposed on the tubular goods and especially on the threaded connections. Thus, it is now common to employ seal elements within couplers to engage each of the opposite tubing pin ends in order to seal against interior fluid and pressures, and to combat leakage.

Tubing strings must periodically be withdrawn for service, inspection or replacement of problem components, so that tubing strings commonly require repeated make-ups. Seals used in the string must therefore also be reusable as many times as feasible. In the present state of the art, the pipe strings are extremely long and must withstand not only high pressures and temperatures but also harsh and corrosive environments. Accordingly, minor irregularities and non-uniformities in the seals, the plastic coating or the tubing can be the source of major and costly problems.

While modern plastic coating methods are efficient, they do not always assure uniformity in critical thread regions. For example coating layer discontinuities can often appear in pin end regions, because uniform deposition of coating is more difficult in such transition regions. It is, in other words, sometimes dubious, as to whether available manufacturing procedures have provided a uniform corrosion barrier and effective sealing against high internal pressures, even where an internal seal has been employed.

Moreover, there are certain factors inherent in synthetic materials used in tubing connections which render seals formed from such materials susceptible to failure when exposed to high pressure gases, particularly under elevated temperatures. "Teflon" is a material widely used for petroleum seals, because of its chemical stability and resilient properties. The chemistry of "Teflon" and other plastic formulations, however, is such that pressurized gases will, with time, permeate into and throughout the seal. When there has been sufficient exposure to such permeating gases, a seal may in time become fully permeated and begin to distort in shape. If the internal pressure is reduced or relieved, the gas-permeated seal is apt to implode into the tubing string or distort in shape, losing its sealing capability. This loss of seal integrity requires removal and repair of the entire string. Accordingly, there exists a need for a superior seal/corrosion barrier and coupling combination which can meet the aggravated and demanding conditions imposed by high pressure, high temperature, corrosive downhole environments.

SUMMARY OF THE INVENTION

A sealing/corrosion barrier system in accordance with the invention employs a purposefully asymmetric reusable sealing element as part of an interior annular two-piece geometry employing materials of different properties in a fashion which enables long term use and repeated make-up.

In accordance with the invention, a sealing/corrosion barrier system includes a principal body element of typical seal material, e.g. "Teflon" having a central body region of substantially constant inner diameter that is longitudinally slightly off center. The central body region is asymmetrically divided by an internally directed retainer shoulder. Adjacent to, but spaced from the retainer shoulder in the constant I.D. section, are one or more radial differential pressure elimination ports extending through the wall of the body element at at least one circumferential location. Around the periphery of a generally central region of the body also is a gas groove of limited depth that intercepts the differential pressure elimination ports.

The "Teflon" body element is tapered longitudinally from its central region in opposite directions to minimum thickness at its longitudinal ends. Again, however, these wings or tapers are asymmetric in that the length of taper on the mill end side is significantly less than the length of taper on the field end side. Within the "Teflon" body, in engagement with, and about, the constant inner diameter portion of the body, and further in abutment with the retainer shoulder, is a reinforcing ring of high tensile and corrosion resistant properties. In this example the reinforcing ring is of polyether ether ketone ("Peek") but it can also be made of suitable metallic materials. The reinforcing ring has an outer circumference flush with the inner surface of the central seal/corrosion barrier body and an inner circumference substantially flush with the inner surfaces of the pin ends of inserted pipe. The "Teflon" body also includes circumferentially outwardly directed ridges at longitudinally spaced apart locations that are of low height relative to the outer circumference of the central body but engage in mating grooves in the opposing face of the coupling to prevent longitudinal shifting of the seal when a pin end is torqued into position. To this end, a shaped tool mating with the interior of the seal element may be inserted within the seal interior to prevent the formation of wrinkles in the seal as torque is applied to the pin and the seal is correspondingly deformed.

The combination of the "Teflon" seal and the interior "Peek" reinforcing ring provide, by virtue of their material properties and geometry, a combination of structural integrity under high pressure and also non-reciprocal response to internal pressurization. With the ring body in place, the tapered longitudinal end wings receive the inserted threaded pin ends and deform in compliance to the pin end threads. This engagement occurs first at the mill end wing as the pin end is being threaded into a selected depth with chosen torsional force. The "Teflon" body is held in place longitudinally by the engagement of the outer pressure ridges in the receiving grooves in the coupling and the inserted mating tool. The "Peek" retainer ring is then installed and consequently closes off the radial ports through the body.

At the field site, the tubular elements with attached coupling sleeves can then be assembled into a string. To this end, a new length of tubing is stabbed into an open end of the coupling sleeve and is tightened until it engages into the tapered wing at the field end side to a desired torque level. During torquing, the external pressure ridges prevent longitudinal displacement of the ring body relative to the coupling sleeve, so the desired final geometric disposition of components is achieved, thus virtually eliminating the possibility of explosive decompression of the seal material.

In operation, internal gas pressures that are encountered may cause, over time, permeation of the gases through the matrix of the "Teflon" until the gases build up in the small but adequate gas groove. If the tubing string is then removed from the well site, or the internal pressure in the tubing is suddenly relieved, the gases which have permeated through the "Teflon" are readily able to flow in a low impedance path from the gas groove through the radial ports and then to the interior of the tubing. Thus any differential gas pressures on the "Teflon" body and the "Peek" reinforcing ring are almost instantaneously relieved. Also during operations, minute amounts of fluid can work their way between the "Peek" ring and "Teflon" ring, passing through the differential pressure elimination ports, then filling the gas groove and making contact with the steel surface at the center of the coupling sleeve. The form and fit of the internal diameter of the "Teflon" seal and the external diameter of the "Peek" ring allow the fluid in, but eliminate any possibility of exit. Any corrosive activity that takes place between the Teflon ring and steel coupling internal diameter is also minute, resulting merely in the discoloration of the steel surface and no structural or mechanical damage to the steel coupling. Since the fluid electrolytes cannot be circulated or otherwise renewed, a dead corrosion cell is established at the conclusion of one ion exchange, and further corrosion is eliminated.

With repeated withdrawals and disassembly of the string, the relatively longer field end wing on the central body enables repeated makeovers. Each time the seal is reused the threaded pin end of the tubing can penetrate the field end wing to slightly greater depths, maintaining the sealing/corrosion bather performance and mechanical integrity as the desired operative API specified torque level is reached in each instance.

BRIEF DESCRIPTION OF THE DRAWINGS

A better understanding of the invention may be had by reference to the following description, taken in conjunction with the accompanying drawings, in which like numerals refer to like parts, and wherein.

DETAILED DESCRIPTION OF THE INVENTION

Figure 1:
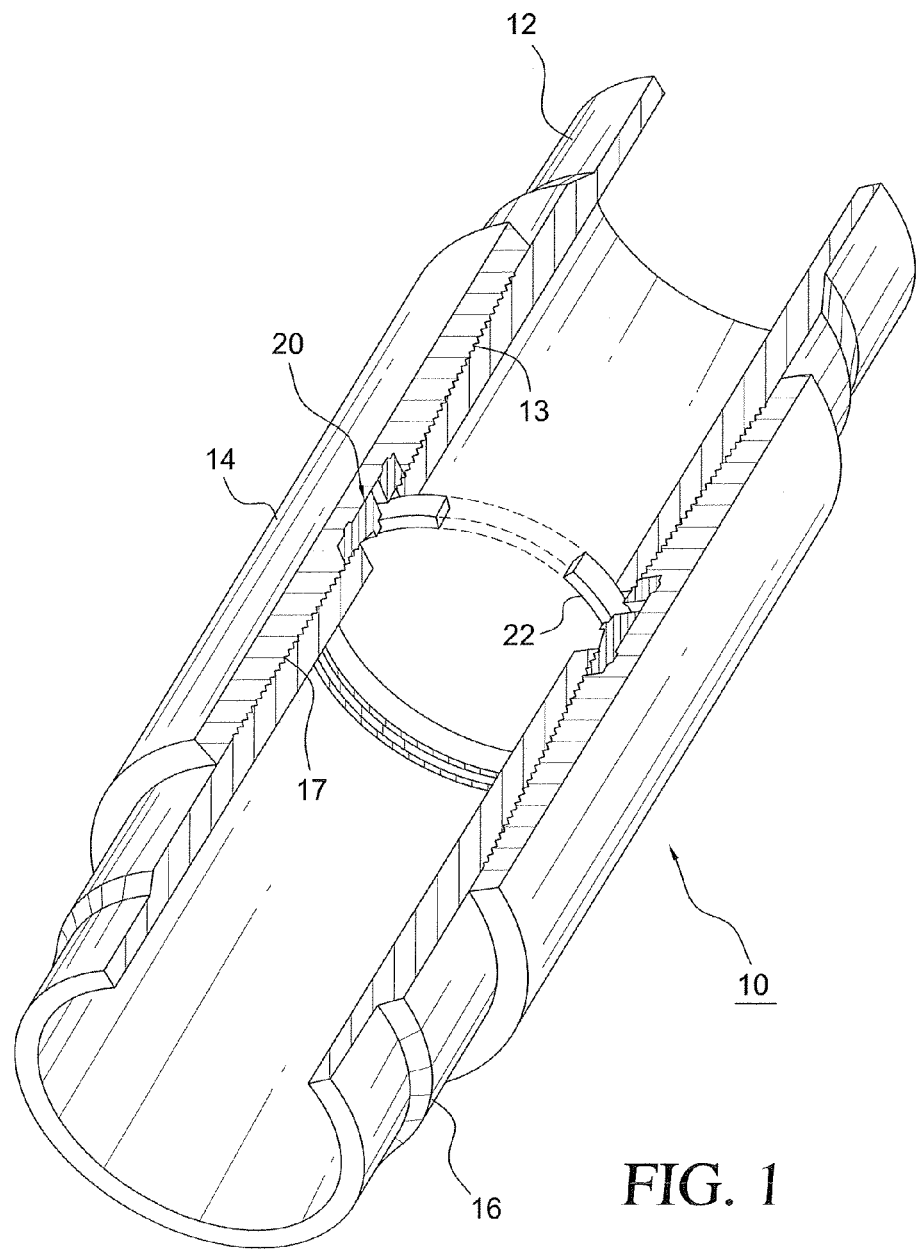
FIG. 1 is a perspective view, partially broken away, of adjacent pin ends on a tubing string within a configuration of coupling sleeve and internal seals in accordance with the invention.
Figure 2:
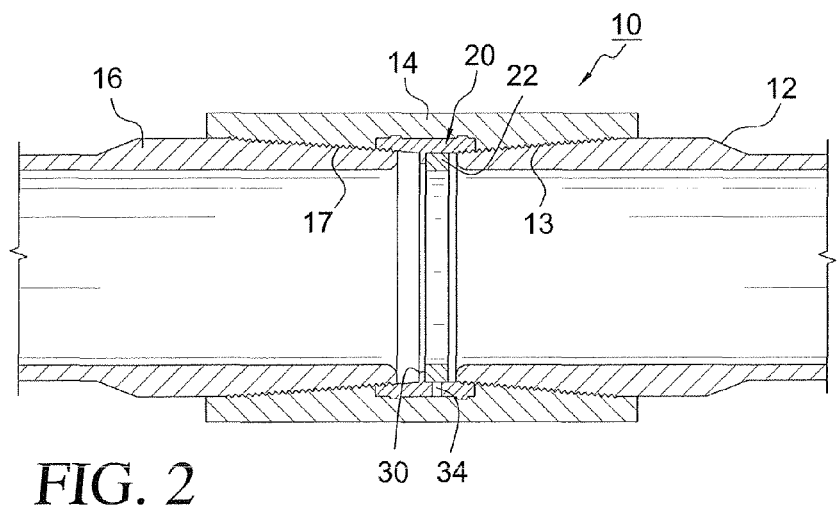
FIG. 2 is a side sectional fragmentary view of relevant portions of the seal elements, coupling sleeve, and engaged pin ends in the assembly of FIG. 1.
Figure 3:
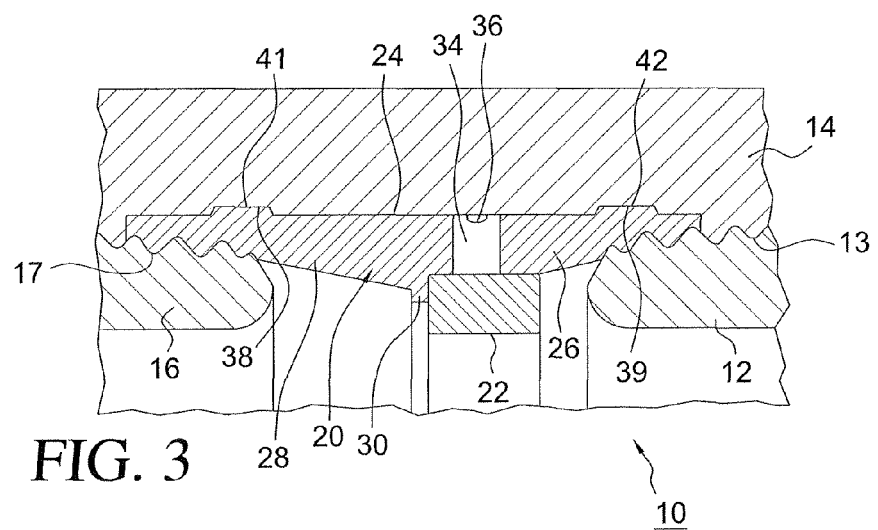
FIG. 3 is a detailed but fragmentary enlarged side sectional view of a segment of the assembly of FIGS. 1 and 2 showing the engagement of a coupling and pin ends to seal elements in accordance with the invention.

An example of a single section 10 of a string of tubular elements with sealed connections in accordance with the invention, for a modern petroleum production application is shown in FIG. 1 and comprises one of a number of interconnecting coupling sleeves 14 for joining the pin ends of tubing 12, 16 entering a coupling sleeve 14 from opposite ends. Details can more clearly be seen in FIGS. 2-4, to which reference is also made. The tubular items may use round, buttress or other threads, with the example here chosen being of a tubing string with 8" round threads, although the sealing system described herein is equally applicable to tubing and casing having other thread configuration. A tubing 12 or pipe on the mill end side has pin end male threads 13 which mate with female threads in the associated mill end of a coupling sleeve 14, often interchangeably called a coupler or collar. The connection, as fully made up in the field site, includes the field end tubing 16, with pin end male threads 17 engaged into the sleeve 14 on the field end side. The tubing in each end of a coupling 14 is torqued to a predetermined level, or to a number of turns, in known fashion. Although make-up to an equal number of turns is shown by way of example in the Figures, it should be noted that the mill end side connection, once completed, is substantially invariant because makeup and breakout is effected on the opposite side. On the field end side, the depth of the penetration of the pin end varies because the greater the number of times the connection is made up, the greater depth of penetration of the field pin end usually needed for proper sealing as the seal deforms.

The combination further includes a shaped "Teflon" seal ring body 20 and an interior reinforcing ring 22 of a less permeable, but higher modulus material, here preferably a polyether ether ketone ("Peek") material. "Peek" material in its extruded form has the following typical properties (modulus values tend to be substantially higher when the material is reinforced with glass or carbon fiber):

| | |
|---|---|
| Tensile Strength (psi) | 16,000 |
| Tensile Modulus (psi | 500,000 |
| Tensile Elongation at Break (%) | 20 |
| Flexural Strength (psi) | 25,000 |
| Flexural Modulus (psi) | 600,000 |
| Compressive Strength (psi) | 20,000 |
| Compressive Modulus (psi) | 500,000 |
| Hardness Rockwell | M100 (R126) |
| IZOD Impact Notched (ft-lb/in) | 1.0 |

Figure 4:
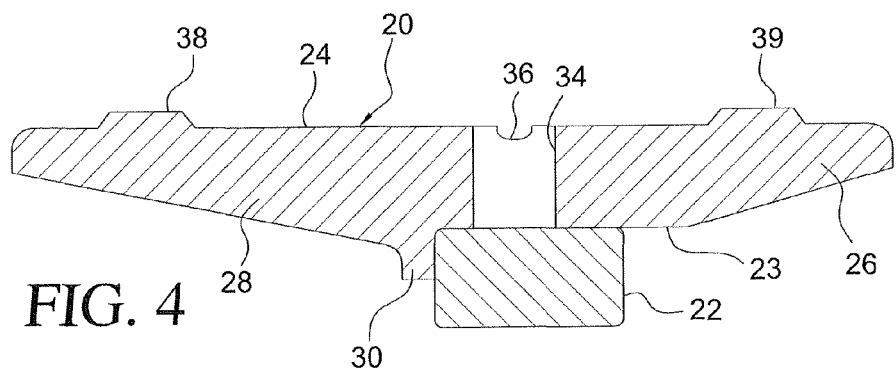
FIG. 4 is a fragmentary, side sectional view of the seal elements in unstressed relation.

The interior reinforcing ring 22 is generally rectangular in cross-section and mates within an interior circumferential, substantially uniform diameter, seating surface 23 on the central region of the seal ring body 20, as seen in FIG. 4. This central inner diameter section 23 is longitudinally offset toward pin 12 on the mill end side and merges into a mill end tapered wing 26 converging to the transverse mill end surface over a predetermined length. At the other end of the Teflon seal ring body 20, a tapered wing 28 on the field end side converges over a relatively longer length, as compared to the length of the mill end tapered wing 26, to its end surface. This configuration enables repeated make-ups of the coupling, by making and breaking engagement of the pin end to the seal ring body 20 at the field end while the connection at the mill end side remains unchanged.

Offset slightly from the longitudinal center of the coupling body 10 is a radially inwardly directed shoulder 30 at one longitudinal end of the slightly offset central inner diameter section 23, which shoulder 30 defines the positional limit of an inserted "Peek" interior reinforcing ring 22. An internal circumference of the internal reinforcing ring 22 is substantially flush with an inner surface of the inserted tubing pin ends 12, 16, while the inwardly directed shoulder 30 on the seal ring body 20 terminates radially outside the inner circumferences defined by the interior reinforcing ring 22 and tubing 12, 16. Consequently, with the interior reinforcing ring 22 in position on the central internal diameter section 23 of the seal ring body 20, the internal surface presented by the coupling 10 includes a length defined by the inner surface of the reinforcing ring 22 that is flush with the interior circumferences of the tubing lengths 12, 16. Short gaps exist between the inserted tubing 12, 16 and the ends of the reinforcing ring 22, but these short discontinuities are bounded by surfaces of the inserted seal ring body 20 and remain sealed.

In this position, the reinforcing ring 22 covers the interior aperture of one or more radial ports 34 in the seal ring body 20 which each such radial port 34 has a diameter that is a fraction of the longitudinal length of the reinforcing ring 22. In this example, there are two such radial ports, 34, located on opposite circumferential sides of the seal ring body 20. These radial ports 34 provide openings for elimination of differential pressure and eliminate circulation of electrolytes. The seal ring body 20 also includes a small peripheral circumferential gas groove 36 about the body, and intersecting the radial ports 34. The gas groove 36 is accordingly slightly offset from the longitudinal center of the seal ring body 20 and has a depth of about ⅛" and a generally hemispherical shape, although the shape is not critical. The seal ring body 20 also includes, on its outer surface 24, a pair of longitudinally spaced apart circumferential ridges or sealing pressure points 38, 39 which have relatively sharply angled side walls and which are less than about ¼" height relative to the outer diameter of the seal ring body 20. To receive these ridges 38, 39, the collar or coupling sleeve 14 includes receiving grooves 41 and 42 at correspondingly longitudinally spaced positions. Therefore, once the seal ring body 20 is inserted longitudinally to engage in the collar 14 by overcoming the mechanical resistance offered by the slightly smaller diameter of the collar 14, the sealing pressure points or circumferential ridges 38, 39 fit into the receiving grooves 41, 42. The torque exerted on the seal, as a first mill pin end is rotated in against the collar, can act to distort or wrinkle the seal ring body 20. To avoid this distortion, it is convenient to insert a retainer tool shaped to mate with the seal ring body interior, and to hold it constrained as the pin threads force into and deform the seal ring body 20 where they engage the resilient material. Once the mill end pin of tubing 12 is in place, the seal ring body 20 does not shift or wrinkle (after the retainer tool is removed). The seal ring body 20 thereafter retains its desired longitudinal position as the field pin end of the tubing 16 is torqued into position against the adjacent wing 28 of the seal ring body 20.

With this configuration, the connection between the intercoupling sleeve 14 and the tubing lengths 12, 16 can be made up and disassembled a number of times, breaking only the engagement between the field end tubing 16 and the field end wing 28 in the coupling sleeve 14. The internal pressures that normally distort a "Teflon" seal by long-term build-up of pressure and permeation through the seal ring body 20 do not result in distortion by permeation because of the presence of the interior reinforcing ring 22. The gas permeation through the "Teflon" which does occur under pressure is effectively accumulated in the gas groove 36 over a period of time but the inwardly directed forces generated, as the permeated gases collect, do not cause substantial distortion of the seal ring body 20. Instead because of the presence of the less permeable high modulus "Peek" reinforcing ring 22 in the central region of the seal ring body 20, inward displacement is effectively opposed. If the internal pressure within the tubing string suddenly drops, or the string is to be removed for service or because of other reasons, the built-up pressure discharges through the radial ports 34 in a few seconds time, retaining the integrity and shape of the seal ring body 20 and preventing displacement of the seal ring body 20 and of the interior reinforcing ring 22 from position. Consequently, the dual mating seal geometries and the materials employed sharply restrict the tendencies toward seal distortion and failure.

Those skilled in the art will appreciate how variations in materials and geometries can be employed to like or other effects, as needed. Structural reinforcement of a pressure distortable sealing material by an associated conforming element in accordance with the invention can limit failures and field maintenance problems. Providing flow collection and escape paths for through-permeating gases also are of benefit to on-site operation.

Although there have been described above and illustrated in the drawings various alternatives in accordance with the invention, the invention is not limited thereto but encompasses all forms and variations in accordance with the appended claims.

The invention claimed is:

1. A seal combination for mounting within the central receiving region of a coupling sleeve into which tubing pin ends are inserted at opposite ends of the sleeve, for maintenance of at least one of seal and corrosion barrier integrity, despite repeated make-up of the elements in a tubing string with intervening disassembly, the combination comprising:

a unitary seal ring body of resilient material and including a substantially central uniform outer diameter section extending longitudinally along the seal ring body and including terminating wings with tapers converging to an internal side and extending longitudinally to the opposite ends of the seal ring body, the seal ring body including a radially inwardly directed shoulder concentric with a central longitudinal axis and spaced apart from the longitudinal center of the seal ring body, the seal ring body also including, between the terminating wings, an inner circumferential seating surface of substantially uniform inner diameter and positioned longitudinally adjacent the shoulder, and a reinforcing ring of synthetic resin material having higher tensile and compressive modulus values and greater impermeability to permeating gasses than those of the seal ring body, said reinforcing ring having an outer circumference engaging the inner circumferential seating surface of the seal ring body longitudinally adjacent the shoulder extending therefrom, the reinforcing ring having a smaller inner radius than a radius of the inner circumference of the shoulder.

2. The combination as set forth in claim 1 above, in which the terminating wings of the sealing ring body each have different longitudinal lengths and angles, with a mill end wing length being shorter than a field end wing length and being located adjacent the seating surface, on the opposite side of the seating surface from the shoulder.

3. The combination as set forth in claim 2 above, wherein an outer circumference of the seal ring body includes a circumferential gas groove, and wherein the seal ring body includes at least one radial port extending through a wall of the seal ring body and intercepting the circumferential outer groove.

4. The combination as set forth in claim 3 above, wherein the seal ring body further includes spaced circumferential ridges on the outer circumference thereof, and the interior circumference of the reinforcing ring has substantially the same inner diameter relative to the central axis of the ring body as inner circumferences of the tubing pin ends to be inserted into the coupling sleeve combination.

5. The combination as set forth in claim 4 above, wherein the circumferential groove in the seal ring body has a width and a depth no greater than about 0.15 in., wherein there are two radial ports extending through the seal ring body wall and each less than approximately ⅛" in diameter, and wherein the circumferential ridges each have a width of 0.15 in and protrude by no more than about 0.125 in. from the outer circumference of the seal ring body.

6. The combination as set forth in claim 5 above wherein the seal ring body is of "Teflon" material and wherein the reinforcing ring is one of polyether ether ketone and a suitable metallic material.

7. A tubular coupling system for receiving, at its opposite ends, the male threaded pin ends of tubing lengths to make up a pressure resistant, reusable tubing string and comprising:
a coupling sleeve having internally threaded ends for receiving pin ends with male threads, the coupling sleeve further including an interior seating surface;
a unitary seal ring body of synthetic resilient material configured to seat within the interior seating surface of the coupling and to seal between the male threaded pin ends of tubing lengths inserted into the coupling sleeve and the coupling sleeve;
the seal ring body further including integral interior tapered end wings of asymmetric longitudinal length extending oppositely from an intermediate body region thereof, said intermediate body region having a substantially constant diameter section defining an interior circumferential seating surface positioned between the tapered wings, and at least one radial port extending through the body wall of the seating surface on the seal ring body, the seal ring body also including a peripheral gas groove in an outer circumference of the seal ring body, and an inwardly projecting shoulder adjacent the interior circumferential seating surface, said inwardly projecting shoulder terminating at a greater radius from the central longitudinal axis of the seal ring body than the internal surfaces of the pin ends of the inserted tubing lengths, and
a reinforcing ring of a material having greater tensile and compressive modulus values and less gas permeability than the seal ring body material, the reinforcing ring having an outer diameter which mates with an inner circumference of the interior circumferential seating surface of the seal ring body and having an inner diameter which substantially matches an inner diameter of the pin ends of tubing to be inserted into the coupling system.

8. The coupling system as set forth in claim 7 above, wherein the material of the seal ring body is of the class of synthetic resin materials comprising "Teflon" and wherein the material of the reinforcing ring is of the class of materials comprising polyether ether ketone.

9. The coupling system as set forth in claim 7 above, wherein the seal ring body comprises two radial ports diametrically opposite from each other in a ring body wall, and where the peripheral gas groove is less than approximately 0.15" in depth, and wherein the pin end threads to be engaged into the coupling sleeve ends penetrate into the respective tapered end wings of the sealing ring body.

10. The coupling system as set forth in claim 9 above, wherein the tapered end wing on the side of the seal ring body to be coupled to the mill end-installed tubing length is shorter and of a higher taper angle than the tapered end wing on the side of the seal ring body to be coupled to the field end-installed tubing length.

11. The coupling system as set forth in claim 10 above, wherein the interior seating surface of the coupling sleeve includes two spaced apart interior circumferential grooves and further wherein the seal ring body includes two exterior circumferential ridges, spaced apart to mate individually with the interior circumferential grooves on the sleeve when the seal ring body is inserted into position in the sleeve.

12. A tubing connection improvement to inhibit failures such as those arising from seal distortion due to permeation in a downhole environment of pressurized gases into internal seals within couplings, in a tubing system in which pin ends of tubing lengths are threaded into opposite ends of couplers, the improvement comprising:
a first circumferential seal element of synthetic resin disposed within a generally central region of the coupler and exposed to internal pressurized gases passing within the tubing system between the inserted pin ends of opposed tubular elements, the first circumferential seal element including a gas collection volume in its outer surface facing the encompassing coupler, and at least one radial port extending between opposite inner and outer circumferential faces of the first circumferential seal element, intermediate the positions of opposed inserted pin ends, and
a second seal and pressure control element of annular configuration disposed in engagement with the interior of the first circumferential seal element and formed of a synthetic resin material having higher tensile and compressive modulus values and less permeability than those of the first circumferential seal element, and enclosing an internal terminus of the at least one radial port.

13. The tubing connection improvement as set forth in claim 12 above, wherein the first circumferential seal element includes an interior shoulder disposed in an intermediate region of the first circumferential seal element, and an adjacent uniform diameter seating surface engaging the second seal element and including the at least one radial port therein.

14. The tubing connection improvement as set forth in claim 13 above, wherein the first circumferential seal element includes longitudinal terminating ends which have different lengths and taper angles, with the terminating end on a mill end pipe side being shorter and of greater taper angle than those on a field end pipe side, wherein the gas collection volume comprises a circumferential groove in an intermediate region of the first seal element, and wherein the exterior circumference of the first circumferential seal element includes at least one circumferential positioning ridge for engaging a mating surface an interior wall of the coupler.

15. A method of inhibiting distortion of a synthetic resin seal element because of exposure to interior pressurized gases in a seal within a coupler joining two spaced apart pipe ends in one of oil and gas production and injection tubing, the method comprising the steps of:

providing a synthetic resin seal element of a resilient material and having an inner circumferential seating surface;

providing an interior gas collection volume between an interior surface of the coupler and an exterior surface of the synthetic resin seal element which is disposed within the coupler between two spaced apart pin ends;

providing a reinforcing ring of a material having higher tensile and compressive modulus values and greater impermeability to permeating gases than those of the synthetic resin seal element;

positioning the reinforcing ring engaging the inner circumferential sealing surface of the synthetic resin seal element;

receiving permeating gases impregnating through the synthetic resin seal element in the interior gas collection volume;

providing a gas release path through the synthetic resin seal element from the gas collection volume; and releasing gas collected by permeation into the gas collection volume through said gas release path into the interior of the coupling system for the one of production and injection tubing when internal pressure in the coupler is reduced.

16. The method as set forth in claim 15 above, further including the step of restraining the body of the seal element from substantially deforming due to interior permeation of gases during oil and gas production operations and maintaining the gas collection volume and gas release path substantially open.

* * * * *

UNITED STATES PATENT AND TRADEMARK OFFICE
CERTIFICATE OF CORRECTION

PATENT NO. : 8,251,139 B2  
APPLICATION NO. : 12/712726  
DATED : August 28, 2012  
INVENTOR(S) : Kenneth J. Carstensen Page 1 of 1

It is certified that error appears in the above-identified patent and that said Letters Patent is hereby corrected as shown below:

Column 6, in claim 1, at line 41, after "corrosion", change "bather" to --barrier--.

Signed and Sealed this  
Twenty-second Day of January, 2013

David J. Kappos  
*Director of the United States Patent and Trademark Office*